US008661742B1

(12) United States Patent
Hunt

(10) Patent No.: US 8,661,742 B1
(45) Date of Patent: *Mar. 4, 2014

(54) MOISTURE AND RUNOFF REMOVAL SYSTEM

(76) Inventor: Christopher M. Hunt, Atlanta, GA (US)

( * ) Notice: Subject to any disclaimer, the term of this patent is extended or adjusted under 35 U.S.C. 154(b) by 555 days.

This patent is subject to a terminal disclaimer.

(21) Appl. No.: 11/123,635

(22) Filed: May 6, 2005

Related U.S. Application Data

(63) Continuation-in-part of application No. 10/201,035, filed on Jul. 23, 2002, now Pat. No. 7,204,060, which is a continuation-in-part of application No. 09/784,848, filed on Feb. 16, 2001, now abandoned, and a continuation-in-part of application No. 09/741,787, filed on Dec. 21, 2000, now abandoned.

(60) Provisional application No. 60/183,472, filed on Feb. 18, 2000.

(51) Int. Cl.
*E04B 7/20* (2006.01)
*E04D 13/04* (2006.01)

(52) U.S. Cl.
USPC ............... 52/91.1; 52/15; 52/97; 52/302.1

(58) Field of Classification Search
USPC .......... 52/94, 95, 91.1, 90.1, 91.2, 302.1, 52/302.3, 302.6, 11, 12, 15, 16, 97, 533, 52/284, 741.41, 344, 674, 93.2, 408, 596, 52/600; 404/2, 3, 4, 5; 405/36; 210/170.03, 474
See application file for complete search history.

(56) References Cited

U.S. PATENT DOCUMENTS

| | | | | | |
|---|---|---|---|---|---|
| 633,984 | A | * | 10/1899 | Blocher | 52/15 |
| 718,823 | A | * | 1/1903 | Darlington | 52/302.4 |
| 723,175 | A | * | 3/1903 | Meyers | 52/213 |
| 826,451 | A | * | 7/1906 | Tantor | 52/15 |
| 842,590 | A | * | 1/1907 | Tayntor | 52/15 |
| 853,909 | A | * | 5/1907 | Tayntor | 52/15 |
| 857,601 | A | * | 6/1907 | Cooper | 52/13 |
| 947,492 | A | * | 1/1910 | Edwards | 52/342 |
| 1,046,910 | A | * | 12/1912 | Wagner | 52/15 |
| 1,069,503 | A | * | 8/1913 | Wagner | 52/92.2 |
| 1,079,152 | A | * | 11/1913 | Stentzel | 52/91.2 |
| 1,142,253 | A | * | 6/1915 | Harris | 52/96 |
| 1,176,611 | A | * | 3/1916 | Smith | 404/2 |
| 1,204,259 | A | * | 11/1916 | Egger et al. | 52/15 |
| 1,293,377 | A | * | 2/1919 | Donaldson | 52/289 |
| 1,562,346 | A | * | 11/1925 | Leidich | 52/97 |

(Continued)

FOREIGN PATENT DOCUMENTS

| | | | | |
|---|---|---|---|---|
| EP | 0 373 019 A1 | * | 6/1990 | |
| GB | 2 084 209 A | * | 4/1982 | |
| JP | 04247136 A | * | 9/1992 | E04B 1/00 |

*Primary Examiner* — Robert Canfield
(74) *Attorney, Agent, or Firm* — Rodgers & Rodgers

(57) ABSTRACT

A roof panel, roof or structure comprising a roof panel body having an edge comprising a fascia water deflection system, said fascia water deflection system comprising a chamfer having at least one sharply angled ridge. In some embodiments, said roof panel body is provided with a trough adjacent to said edge, so that when said roof panel body is installed on a structure, said trough runs at a downward angle and water entering said trough flows by force of gravity through said trough. In other embodiments, the roof panel body is coated with a waterproof roofing material.

23 Claims, 2 Drawing Sheets

(56) References Cited

U.S. PATENT DOCUMENTS

| | | | | |
|---|---|---|---|---|
| 1,592,807 A * | 7/1926 | Forrest | | 52/344 |
| 1,736,873 A * | 11/1929 | Barton | | 52/674 |
| 2,045,482 A * | 6/1936 | Maier | | 52/316 |
| 2,104,878 A * | 1/1938 | Magnuson | | 52/281 |
| 2,208,191 A * | 7/1940 | Kerr | | 52/344 |
| 2,242,834 A * | 5/1941 | Price | | 52/344 |
| 2,392,232 A * | 1/1946 | Crafton | | 52/410 |
| 2,691,291 A * | 10/1954 | Henderson | | 52/79.9 |
| 3,295,264 A * | 1/1967 | Olson | | 52/12 |
| 3,305,982 A * | 2/1967 | Steele | | 52/90.1 |
| 3,319,387 A * | 5/1967 | Stewing et al. | | 52/223.7 |
| 3,417,570 A * | 12/1968 | Pegan et al. | | 405/119 |
| 3,498,015 A * | 3/1970 | Green et al. | | 52/310 |
| 3,756,895 A * | 9/1973 | Bellamy | | 156/257 |
| 3,763,605 A * | 10/1973 | Freeman | | 52/58 |
| 4,026,268 A * | 5/1977 | Bartos et al. | | 126/626 |
| 4,114,335 A * | 9/1978 | Carroll | | 52/336 |
| 4,172,346 A * | 10/1979 | Kuroiwa | | 52/408 |
| 4,226,056 A * | 10/1980 | Hallam | | 52/11 |
| 4,683,689 A * | 8/1987 | Loggy | | 52/80.1 |
| 4,759,158 A * | 7/1988 | Aubry | | 52/79.2 |
| 4,859,723 A * | 8/1989 | Kyminas et al. | | 524/31 |
| 4,947,603 A * | 8/1990 | Goertz | | 52/309.4 |
| 4,980,997 A * | 1/1991 | Tawzer | | 52/15 |
| 5,246,495 A * | 9/1993 | Helmstetter | | 106/600 |
| 5,251,415 A * | 10/1993 | Van Auken et al. | | 52/407.4 |
| 5,268,028 A * | 12/1993 | Fifield | | 106/726 |
| 5,359,816 A * | 11/1994 | Iacouides | | 52/274 |
| 5,406,764 A * | 4/1995 | Van Auken et al. | | 52/408 |
| 5,577,354 A * | 11/1996 | Van Doren | | 52/94 |
| 5,685,116 A * | 11/1997 | Bradshaw et al. | | 52/311.1 |
| 5,761,862 A * | 6/1998 | Hendershot et al. | | 52/271 |
| 5,794,386 A * | 8/1998 | Klein | | 52/91.1 |
| 5,870,864 A * | 2/1999 | Snyder et al. | | 52/169.5 |
| 6,119,417 A * | 9/2000 | Valverde et al. | | 52/223.7 |
| 6,185,889 B1 * | 2/2001 | Gilgan et al. | | 52/302.1 |
| 6,202,366 B1 * | 3/2001 | Snyder et al. | | 52/97 |
| 6,519,904 B1 * | 2/2003 | Phillips | | 52/309.12 |
| 6,643,981 B2 * | 11/2003 | Pina et al. | | 52/91.2 |
| 7,062,882 B2 * | 6/2006 | Porat | | 52/12 |
| 7,204,060 B2 * | 4/2007 | Hunt | | 52/284 |
| 2001/0037610 A1 * | 11/2001 | Davis | | 52/12 |
| 2001/0045070 A1 * | 11/2001 | Hunt | | 52/284 |
| 2002/0078659 A1 * | 6/2002 | Hunt | | 52/745.13 |
| 2003/0047497 A1 * | 3/2003 | Harris et al. | | 210/163 |
| 2003/0070391 A1 * | 4/2003 | Tachauer et al. | | 52/745.21 |
| 2003/0192264 A1 * | 10/2003 | Boggs | | 52/94 |
| 2004/0031222 A1 * | 2/2004 | Porat | | 52/302.1 |
| 2006/0254169 A1 * | 11/2006 | McFadden | | 52/344 |
| 2007/0266660 A1 * | 11/2007 | Davies et al. | | 52/309.1 |
| 2008/0287053 A1 * | 11/2008 | Carlson et al. | | 454/365 |
| 2008/0304908 A1 * | 12/2008 | Ko | | 404/2 |

\* cited by examiner

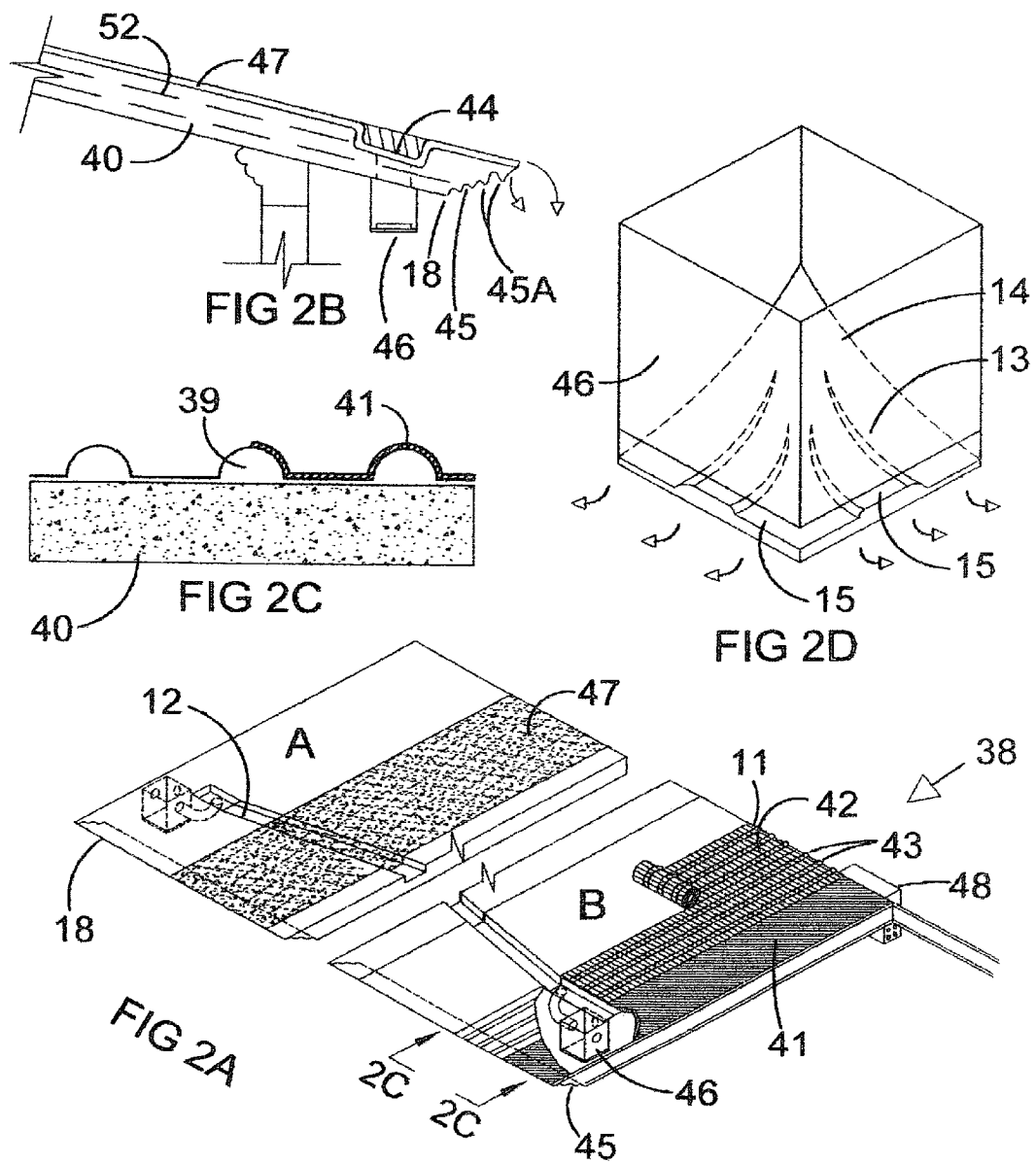

MOISTURE AND RUNOFF REMOVAL SYSTEM

CROSS-REFERENCE TO RELATED APPLICATIONS

This application is a continuation in part of U.S. patent application Ser. No. 10/201,035, filed Jul. 23, 2002, now U.S. Pat. No. 7,204,060, which is a continuation in part of U.S. patent application Ser. No. 09/784,848, filed Feb. 16, 2001, now abandoned, and a continuation in part of U.S. patent application Ser. No. 09/741,787, filed Dec. 21, 2000, now abandoned, which claimed the benefit of U.S. Provisional Application No. 60/183,472, filed Feb. 18, 2000, now expired, the disclosures of which patent applications are incorporated by reference as if fully set forth herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates to manufactured and built structures, such as dwellings. In particular, the invention relates to moisture removal systems for roof systems for structures made of cementitious materials, for example, autoclaved aerated concrete (AAC).

The background art is characterized by U.S. Pat. Nos. 721,178; 723,175; 929,684; 3,603,052; 4,285,179; 4,409,763; 5,143,498; 5,240,052; 5,286,427; 5,516,248; 5,682,934; 5,761,862; 5,794,386; 5,981,030; 6,006,480; 6,098,357; the disclosures of which patents are incorporated by reference as if fully set forth herein.

BRIEF SUMMARY OF THE INVENTION

The purpose of the invention is to provide means for controlling roof moisture and runoff. One advantage of preferred embodiments of the invention is that the integrated (internal) gutter system of preferred embodiments of the invention eliminates costly external gutter systems that must be maintained and replaced. In preferred embodiments, the water deflection system of the present invention not only aesthetically enhances a roof structure but also provides means (e.g., ridges and grooves) having unique reverse (upward) angles to cause water to separate from the fascia, thereby preventing unsightly runs as well as helping mitigate the negative effects of water runoff. The gutter down spout box of preferred embodiments of the invention eliminates the need for unsightly down spouts while simultaneously adding architectural accents to a roof.

In a preferred embodiment, the invention is a roof panel comprising: a roof panel body having an edge comprising a fascia water deflection system, said fascia water deflection system comprising a chamfer having at least one angled ridge. Preferably, said roof panel body is provided with a trough adjacent to said edge, so that when said roof panel body is installed on a structure, said trough runs at a downward angle and water entering said trough flows by force of gravity through said trough. Preferably, said roof panel body is overlaid with a mesh fabric having alternating sections of a tight mesh and a loose mesh.

In another preferred embodiment, the roof further comprises: an elastomeric material that is applied to said mesh fabric in such a way that said elastomeric material penetrates only said loose mesh sections to bond to said roof panel body, such that air channels are created between said tight mesh sections and said roof panel body, which air channels allow moisture in said roof panels to escape, said air channels running unobstructed from a lower starting position to a higher terminating position where said channels discharge said moisture. Preferably, the roof panel further comprises: a curable, liquid-based roofing material that is applied to said roof panel body, wherein said roofing material bonds to said roof panel body, and when cured, is waterproof, is durable, is chemical resistant, has an adequate modulus of elasticity (e.g., one sufficient to provide the strength to span between beams), has a high value of water vapor permeability (e.g., transmits water vapor readily), and can be color tinted.

In another preferred embodiment, the invention is a roof comprising: a plurality of the roof panels disclosed herein. In another preferred embodiment, the invention is a roof comprising: a plurality of cementitious roof panels, each of said cementitious roof panels having a trough and a panel edge comprising a fascia water deflection system having a chamfer with at least one angled ridge which aligns with a similar ridge in other cementitious roof panels and runs parallel to the length of said panel edge, each of said cementitious roof panel having reinforcing that stops short of said panel edge, which resultant area void of reinforcing allows said trough to be cut in the roof adjacent to said panel edge. Preferably, said trough runs at a downward angle, such that trough segments cut in adjacent said roof panels are aligned so that water flows by force of gravity through said trough. Preferably, the roof further comprises: a polyester/nylon mesh fabric featuring alternating sections of a tight mesh and a loose mesh that is applied to said plurality of roof panels. Preferably, the roof further comprises: an elastomeric material that is applied to said mesh fabric in such a way that said elastomeric material penetrates only said loose mesh sections to bond to said plurality of roof panels, such that air channels are created between said tight mesh sections and said plurality of roof panels, which air channels allow moisture in said roof panels to escape, said air channels running unobstructed from a lower starting position to a higher terminating position where said channels discharge said moisture.

In another preferred embodiment, the invention is a roof disclosed herein further comprising: a curable, liquid-based roofing material that is applied to said plurality of roof panels, wherein said roofing material bonds to said plurality of roof panels, and when cured, is waterproof, is durable, is chemical resistant, has an adequate modulus of elasticity, has a high value of water vapor permeability, and can be color tinted.

In another preferred embodiment, the invention is a roof comprising: a plurality of roof panels having edges comprising a fascia water deflection system, said fascia water deflection system comprising a chamfer having at least one sharp angled ridge. Preferably, said roof is provided with a trough that is located adjacent to said edges, said trough running at an angle to said edges so that, when said plurality of roof panels are in use, water entering said trough flows by force of gravity through said trough. Preferably, said roof is further comprised of an overlying layer comprising a mesh fabric having alternating sections of a tight mesh and a loose mesh. Preferably, said roof further comprises an elastomeric material is applied to said mesh fabric to create channels that run from a lower starting position to an upper terminating position. Preferably, the roof further comprises: a curable material that is applied to said roof panels. In another preferred embodiment, the invention is a structure comprising a plurality of walls that form an interior; and a roof disclosed herein covering said interior.

In another preferred embodiment, the roof panel comprises: a roof panel body comprising a top half, a bottom half and structural reinforcing in said bottom half and in at least a portion of said top half, said roof panel body having an edge comprising a fascia water deflection system, said fascia water deflection system comprising a chamfer having at least one angled ridge, said roof panel body being provided with a trough adjacent to said edge and in another portion of said roof panel body that does not have structural reinforcing in its top half, so that when said roof panel body is installed on a structure, said trough runs at a downward angle and water entering said trough flows by force of gravity through said trough.

In yet another preferred embodiment, said curable material is made by combining: a powder component comprising Portland cement in the range of 40 percent to 60 percent of the powder and a crystalline quartz silica in the range of 40 percent to 60 percent of the powder; and a liquid component comprising an acrylic polymers dispersion to produce a combination; wherein said powder component comprises about 60 percent of said combination and said liquid component comprises about 40 percent of said combination. High quality constituents are preferred.

An integral functioning process advantage of the finished edges of the roof panels of preferred embodiments of the present invention lies in a water deflection system that is multifaceted. The edges of the roof having at least one angled ridges (preferably routed) therein makes it impossible for excess moisture from the roof to run down face of the panel fascia. This overcomes two failures of the prior art, namely that: 1) moisture carrying naturally occurring debris running down vertical fascia causes unsightly streaks; and 2) moisture running down the fascia is easily blown back toward the structure. By means of the instant invention, the need for additional labor and material required to install a drip edge is avoided, while adding unique architectural enhancement to the structure.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings that illustrate presently preferred embodiments of the invention. In the drawings:

FIG. 2A is a perspective view of a pair of roof panels in accordance with a preferred embodiment of the invention. The angle at which the angled groove is shown is exaggerated for clarity.

FIG. 2B is a longitudinal cross sectional view of a roof panel in accordance with a preferred embodiment of the invention.

FIG. 2C is transverse cross-sectional view of a roof panel in accordance with a preferred embodiment of the invention.

FIG. 2D is a perspective view of a down spout box in accordance with a preferred embodiment of the invention.

Figure 1:
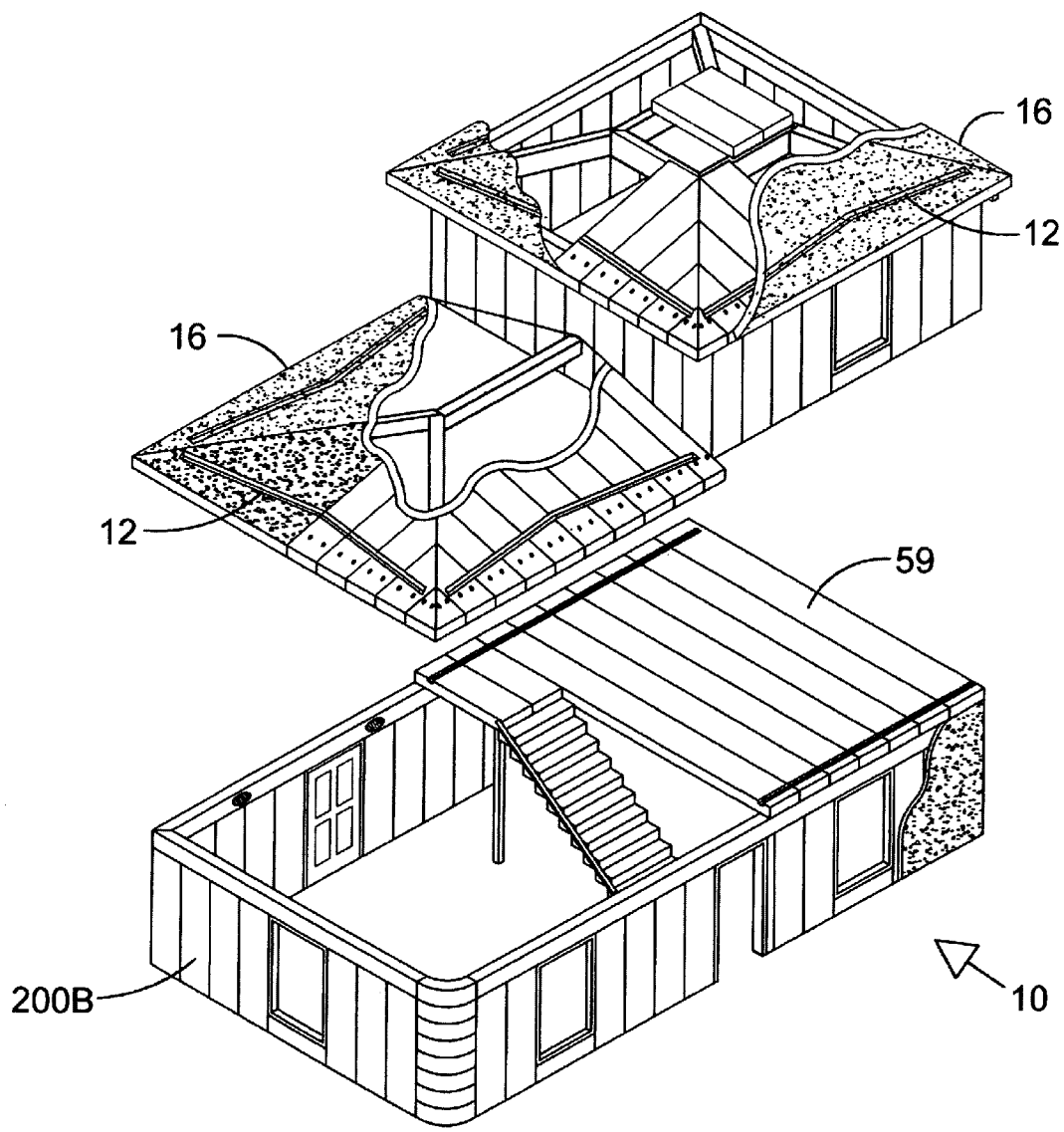
FIG. 1 is an exploded perspective view of a partial, two-story cementitious dwelling constructed in accordance with the teachings of preferred embodiments of the invention, showing specifically a first floor construction, with portions removed, a second floor with a first floor roof that covers part of the first floor, and a second floor roof that covers the second floor.

The following reference numerals are used to indicate the parts and environment of the invention on the drawings:
10 structure
11 loose mesh
12 integrated gutter system
13 interior ridges
14 stepped floor
15 wide slots, slots
16 roof
18 edge
38 roofing system
39 air channels
40 roof panels, AAC panels
41 first water-proofing material, elastomeric material
42 polyester/nylon mesh, mesh
43 tight mesh
44 groove
45 fascia water deflection system
45A sharp angled ridges
46 down spout box
47 second water-proofing material, roofing material
48 top ridge vent
52 upper course of reinforcing
59 floor panels
200B wall blocks

DETAILED DESCRIPTION OF THE INVENTION

Referring to FIG. 1, structure 10 comprising floor panels 59, wall blocks 200B and roofs 16. Each of roofs 16 preferably comprises roof panels 40. Roof panels 40 preferably comprise integrated gutter system 12 and fascia water deflection system 45.

Referring to FIGS. 2A, 2B, 2C and 2D, integrated gutter system 12 preferably incorporates industry-standard AAC roof panels 40 having a modification in steel reinforcing. Because, in a preferred embodiment, each groove 44 is carved into each roof panel 40 with a router, the top row(s) of embedded reinforcing rods 52 do not extend to edge 18. This is possible because there is no need for full (top and bottom) structural reinforcing at the gutter location, as AAC is strong enough without full reinforcing at this location.

In a preferred embodiment, angled routed groove 44 is provided in AAC roof panels 40 to transmit runoff along each roof 16 and to act as an integrated gutter system 12 to carry the runoff to down spout box 46. Thus, integrated gutter system 12 preferably employs gravity-driven water removal.

As illustrated in FIG. 2D, each down spout box 46 preferably disperses runoff out and away from structure 10 by means of stepped floor 14, interior ridges 13 and wide slots 15 at the lower end of stepped floor 14. Interior ridges 13 and steps in stepped floor 14 break up the mass of runoff water into smaller droplets so that, when the runoff is propelled out of box 46, large volumes of water do not overburden any one area of ground around structure 10. Providing interior ridges 13 and providing the different floor heights transversely (preferably ⅛ inch to ¾ inch steps) cause the runoff to form into separate streams. In this way, gutter box 46 discharges the runoff in a sprinkler-like manner, directing it safely away from structure 10 so that landscaping is not damaged.

Preferably, the interior surface of each angled routed groove 44 is preferably covered by roofing material 47. Roofing material 47 is preferably one continuous piece of material that also covers fascia water deflection system 45. Fascia water deflection system 45 is preferably shaped to provide a chamfer having one or preferably more (preferably sharp) angled ridges 45A so that it is effectively impossible for water running off roof 16 at edge 18 to run down the face of fascia water deflection system 45. Rather, in this embodiment, gravity pulls the water off the face at a number of different places. This not only deflects water away from structure 10 but also breaks the runoff stream down into smaller droplets so it does not damage the landscaping beneath the eave. Therefore, the fascia design is not just a cosmetic architectural feature. Rather, it is a functioning aspect of the waterproofing and moisture removal system of roof 16 that is much different from existing plumb fascia boards and molding which may be inclined at an angle but do not have sharp angled ridges 45A.

Therefore, in a preferred embodiment, each of the roof panels 40 is provided with a moisture removal system comprised of cementitious material identical to that used in panels 40 and is preferably the panel material itself. The moisture removal system preferably comprises two components: 1) a downwardly angled trough 44 that uniquely employs gravity to feed moisture to a down spout or down spout box 46; and 2) a fascia water deflection system 45 which has upwardly reversing angles forming a multi-faced edge 18 of cementitious roof 16. This roof system is preferably coated with either of the two water-proofing materials 47 or 41 as shown in FIG. 2A. Both moisture removal attributes are preferably part of the present invention's roofing system and work in conjunction with one another as one moisture removal system.

Referring to FIG. 2A, in section A of roof 16, second water-proofing material 47 preferably has the following characteristics: it is waterproof, durable in any climate, chemical resistant, vapor permeable ("breathes"), and durable over time (10+ year life expectancy); it has a high modulus of elasticity (stretchable), can be continuously re-coated so no waste material has to go to landfills, can be tinted to produce various colors, and bonds well to AAC. It is preferably applied by spray or roller.

Referring to FIG. 2A, in section B of roof 16, roofing system 38 preferably incorporates polyester/nylon mesh 42, having alternate sections of tight mesh 43 and loose mesh 11. Polyester/nylon mesh 42 is preferably placed over the AAC panels so that it extends from the ridge of roof 16 down to the eaves. Next, first water-proofing material (elastomeric composition) 41 is applied to mesh 42, and, as a result of the porosity of loose mesh 11, elastomeric composition 41 passes through loose mesh 11 and adheres to AAC panels 40. However, the elastomeric material 41 does not pass through tight mesh 43 such that air channels 39 are created between tight mesh 43 and the surface of AAC panels 40. Further, another coat of the elastomeric material 41 may be applied for extra wear resistance. Air channels 39 allow moisture that would otherwise be trapped in AAC panels 40 to escape, i.e., air channels 39 allow roof panels 40 to breathe. Additionally, air channels 39 also function as roof cooling means in that air is drawn up through channels 39 from the eaves of roof 16 to top ridge vent 48 by naturally occurring temperature differences and wind, where it may be vented to the atmosphere.

In a preferred embodiment, roofing material 47 comprises two primary components, component A and component B. Component A is preferably a powder and B is preferably a water-based liquid. Roofing material 47 is made by mixing the components together at an approximate ratio (more preferably a strict ratio) of 60 percent component A to 40 percent component B. In a preferred embodiment, a working mixture of roofing material 47 comprises the following: 55 pounds of component A (a powder) comprising Portland cement (preferably in the range of 40 percent to 60 percent of component A) and crystalline quartz silica (preferably in the range of 40 percent to 60 percent of component A); and 22 pounds of component B (a liquid) comprising an acrylic polymers dispersion (preferably 100 percent of component B). In an alternative embodiment, granules are added to the surface of the applied elastomeric composition to protect it from ultraviolet rays, wear, etc. In this embodiment, the granules are 3M Colorquartz aggregate or the type of roofing granules used on conventional asphalt shingles.

Many variations of the invention will occur to those skilled in the art. Some variations include a single component roofing system. Other variations call for use of a multi-component roofing system. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. A roof panel comprising:
   a monolithic autoclaved aerated concrete roof panel body having a top surface comprising a fascia water deflection system, said top surface having an outlet edge, said fascia water deflection system comprising a first surface that is disposed beneath said top surface and extending from said outer edge inwardly and sloping downward and then angled upward at a first acute angle toward a first high point so as to form a first sharp angled ridge at which gravity is operative to pull water of said first surface and a second surface that is sloped downward from said first high point and than angled upward at a second acute angle to form a second sharp angled ridge at which gravity is operative to pull water off said second surface.

2. The roof panel of claim 1 wherein;
   said roof panel body is provided with a trough adjacent to said edge, so that when said roof panel body is installed on a structure, said trough runs at a downward angle and water entering said trough flows by force of gravity through said trough.

3. The roof panel of claim 1 wherein:
   said roof panel body is overlaid with a mesh fabric having alternating sections of a tight mesh and a loose mesh.

4. The roof panel of claim 3, further comprising:
   an elastomeric material that is applied to said mesh fabric in such a way that said elastomeric material penetrates only said loose mesh sections to bond to said roof panel body, such that air channels are created between said tight mesh sections and said roof panel body, which air channels allow moisture in said roof panels to escape, said air channels running unobstructed from a lower starting position to a higher terminating position where said channels discharge said moisture.

5. The roof panel of claim 2, further comprising:
   a curable, water-based roofing material that is applied to said roof panel body, wherein said roofing material bonds to said roof panel body, and when cured, is waterproof, is durable, is chemical resistant, is stretchable, is permeable to water vapor, and can be tinted a color.

6. A roof comprising:
a plurality of the roof panels of claim 1.

7. A roof comprising:
a plurality of the roof panels of claim 2.

8. A roof comprising:
a plurality of the roof panels of claim 3.

9. A roof comprising:
a plurality of the roof panels of claim 4.

10. A roof comprising:
a plurality of the roof panels of claim 5.

11. A roof comprising:
a plurality of cementitious roof panels, each of said cementitious roof panels having a top surface, a trough and a panel edge comprising a fascia water deflection system comprising a plurality of sharp angled ridges which align with similar sharp angled ridges in other cementitious roof panels and that run parallel to the length of said panel edge, each of said cementitious roof panels having reinforcing that stops short of said panel edge, which resultant area void of reinforcing allows said trough to be cut in the roof adjacent to said panel edge;
wherein each said fascia water deflection system comprises surfaces that are disposed beneath said top surface and sloped downward and then angled upward at an acme angle so as to form said sharp angled ridges at which gravity is operative to pull water off said first surface.

12. The roof of claim 11 wherein said trough runs at a downward angle, such that trough segments cut in adjacent said roof panels are aligned so that water flows by force of gravity through said trough.

13. The roof of claim 11 further comprising:
a mesh fabric featuring alternating sections of a tight mesh and a loose mesh that is applied to said plurality of roof panels.

14. The roof of claim 13, further comprising:
an elastomeric material that is applied to said mesh fabric in such a way that said elastomeric material penetrates only said loose mesh sections to bond to said plurality of roof panels, such that air channels are created between said tight mesh sections and said plurality of roof panels, which air channels allow moisture in said roof panels to escape, said air channels running unobstructed from a lower starting position to a higher terminating position where said channels discharge said moisture.

15. The roof of claim 11, further comprising:
at curable, liquid-based roofing material that is applied to said plurality of roof panels, wherein said roofing material bonds to said plurality of roof panels, and when cured, is waterproof, is durable, is chemical resistant, is stretchable, is permeable to water vapor, and can be color tinted.

16. A roof comprising:
a plurality of roof panels, each of said roof panels having a top surface and an edge comprising a fascia water deflection system, said fascia water deflection system comprising a first surface that is disposed beneath said top surface and sloped downward and then angled upward at a first acute angle toward a first high point so as to form a first sharp angled ridge at which gravity is operative to pull water off said first surface and a second surface that is sloped downward from said first high point and then angled upward at a second acute angle to form a second sharp angled ridge at which gravity is operative to pull water off said second surface, and said plurality of roof panels further comprising an overlying layer comprising a mesh fabric having alternating sections of a tight mesh and a loose mesh.

17. The roof of claim 16 wherein said plurality of roof panels is provided with a trough that is located adjacent to said edges, said trough running at an angle to said edges so that, when said plurality of roof panels are in use, water entering said trough flows by force of gravity through said trough.

18. The roof of claim 16 further comprising:
an elastomeric material that is applied to said mesh fabric to create channels that run from a lower starting position to an upper terminating position.

19. The roof of claim 16 further comprising:
a curable material that is applied to said roof panels.

20. A structure comprising:
a plurality of walls that form an interior; and the roof of claim 17 covering said interior.

21. A structure comprising:
a plurality of walls that form an interior; and the roof of claim 16 covering said interior.

22. A roof panel comprising:
a roof panel body comprising a top surface, a top half, a bottom half and structural reinforcing in said bottom half and in at least a portion of said top half, said roof panel body having an edge comprising a fascia water deflection system, said roof panel body being provided with a trough adjacent to said edge and in another portion of said roof panel body that does not have structural reinforcing in its top half, so that when said roof panel body is installed on a structure, said trough runs at a downward angle and water entering said trough flows by force of gravity through said trough;
wherein said fascia water deflection system comprises a first surface that is disposed beneath said top surface and sloped downward and then angled upward at a first acute angle toward a first high point so as to form a first sharp angled ridge at which gravity is operative to pull water off said first surface and a second surface that is sloped downward from said first high point and then angled upward at a second acute angle to form a second sharp angled ridge at which gravity is operative to pull water off said second surface.

23. The roof panel of claim 22 wherein curable material is applied to said roof panel and is made by combining:
a powder component comprising Portland cement in the range of 40 percent to 60 percent of the powder and a crystalline quartz silica in the range of 40 percent to 60 percent of the powder; and
a liquid component comprising an acrylic polymers dispersion to produce a combination; wherein said powder component comprises about 60 percent of said combination and said liquid component comprises about 40 percent of said combination.

* * * * *